US008292327B2

(12) United States Patent
Araya Moreno et al.

(10) Patent No.: US 8,292,327 B2
(45) Date of Patent: Oct. 23, 2012

(54) DEVICE FOR THE OPTIONAL GUIDING OF AT LEAST ONE SELF-STEERING WHEEL OF A TROLLEY

(75) Inventors: Fernando Esteban Araya Moreno, Barcelona (ES); Carles Riba Romeva, San Joan Despí (ES)

(73) Assignee: Fernando Esteban Araya Moreno, Barcelona (ES)

( * ) Notice: Subject to any disclaimer, the term of this patent is extended or adjusted under 35 U.S.C. 154(b) by 63 days.

(21) Appl. No.: 12/877,203

(22) Filed: Sep. 8, 2010

(65) Prior Publication Data

US 2011/0127741 A1    Jun. 2, 2011

Related U.S. Application Data

(63) Continuation-in-part of application No. 11/662,785, filed as application No. PCT/ES2005/000495 on Sep. 14, 2005, now abandoned.

(30) Foreign Application Priority Data

Sep. 15, 2004    (IT) .............................. MI2004A1757

(51) Int. Cl.
 *B60B 33/02* (2006.01)
(52) U.S. Cl. .................... 280/771; 16/35 R; 280/33.991
(58) Field of Classification Search .................. 280/771, 280/33.991; 16/35 R
See application file for complete search history.

(56) References Cited

U.S. PATENT DOCUMENTS

| | | | |
|---|---|---|---|
| 1,863,349 A | 6/1932 | Noelting et al. | |
| 3,190,386 A | 6/1965 | Swinny | |
| 3,751,758 A | 8/1973 | Higbee et al. | |
| 3,881,216 A | 5/1975 | Fontana | |
| 4,336,629 A | 6/1982 | Jarvis et al. | |
| 4,368,806 A * | 1/1983 | Raineri | 188/2 R |
| 4,998,320 A * | 3/1991 | Lange | 16/35 R |

(Continued)

FOREIGN PATENT DOCUMENTS

EP        0 424 234 A1    4/1991

(Continued)

OTHER PUBLICATIONS

International Search Report for PCT International Application No. PCT/ES2005/000495 mailed Jan. 20, 2006.

*Primary Examiner* — Paul N Dickson
*Assistant Examiner* — Nicole Verley
(74) *Attorney, Agent, or Firm* — RatnerPrestia

(57) ABSTRACT

The invention relates to a device for the optional guiding of at least one self-steering wheel of a trolley. According to the invention, the wheel is of the type that is mounted on a support that pivots around a vertical axis. The device comprises: a push bar which forms a dual-articulated steering member that can be accessed by the user; means for rotating a first clutch part about the vertical axis in response to steering member movements; and means which can be used at will to couple and uncouple the first clutch part in relation to a second clutch part which is solidly connected to the aforementioned support of the wheel, in response to other steering member movements. In addition, a coin-operated locking device for preventing the movement of the trolley is built into a casing which houses a transmission element of the guiding device and which is fixed to the push bar of the trolley.

4 Claims, 8 Drawing Sheets

U.S. PATENT DOCUMENTS

| | | | |
|---|---|---|---|
| 5,131,517 A | 7/1992 | DiPaolo et al. | |
| 5,133,106 A | 7/1992 | Milbredt et al. | |
| 5,199,534 A | 4/1993 | Goff | |
| 5,328,000 A | 7/1994 | Rutter et al. | |
| 5,664,645 A | 9/1997 | Rodriguez | |
| 5,774,936 A * | 7/1998 | Vetter | 16/35 R |
| 5,797,611 A * | 8/1998 | Joseph et al. | 280/33.991 |
| 5,819,514 A | 10/1998 | Firdaus | |
| 5,984,333 A * | 11/1999 | Constantijn et al. | 280/250.1 |
| 5,988,323 A | 11/1999 | Chu | |
| 6,161,849 A * | 12/2000 | Schweninger | 280/33.994 |
| 6,240,713 B1 * | 6/2001 | Thomas | 56/16.7 |
| 6,298,950 B1 | 10/2001 | Oelrichs et al. | |
| 6,302,421 B1 * | 10/2001 | Lee | 280/210 |
| 6,584,641 B1 | 7/2003 | Milbredt | |
| 6,668,965 B2 * | 12/2003 | Strong | 180/411 |
| 6,834,746 B1 | 12/2004 | Lin | |
| 6,865,775 B2 * | 3/2005 | Ganance | 16/35 R |
| 7,017,228 B2 * | 3/2006 | Silverstein et al. | 16/35 R |
| 7,083,175 B1 | 8/2006 | Liu | |
| 7,200,894 B2 * | 4/2007 | Block et al. | 16/18 R |
| 7,210,690 B2 | 5/2007 | Tan | |
| 7,406,745 B2 | 8/2008 | Chou | |
| 7,546,908 B2 | 6/2009 | Chang | |
| 7,574,850 B1 * | 8/2009 | Nunez | 56/16.7 |
| 7,676,310 B2 * | 3/2010 | Klein et al. | 701/41 |
| 7,698,760 B2 * | 4/2010 | Reckelhoff et al. | 5/600 |
| 7,992,254 B2 * | 8/2011 | Ahn et al. | 16/35 R |
| 2006/0279051 A1 * | 12/2006 | Stokes | 280/33.991 |
| 2007/0056141 A1 | 3/2007 | Armano et al. | |

FOREIGN PATENT DOCUMENTS

| | | |
|---|---|---|
| EP | 0 701 939 A2 | 3/1996 |
| ES | 8 704 020 | 5/1987 |
| ES | 2 153 729 | 3/2001 |
| FR | 2 824 020 | 10/2002 |
| GB | 2 269 095 A | 2/1994 |
| GB | 2 366 199 A | 3/2002 |
| WO | WO 92/10388 | 6/1992 |
| WO | WO 94/01292 A1 | 1/1994 |
| WO | WO 95/08449 | 3/1995 |

* cited by examiner

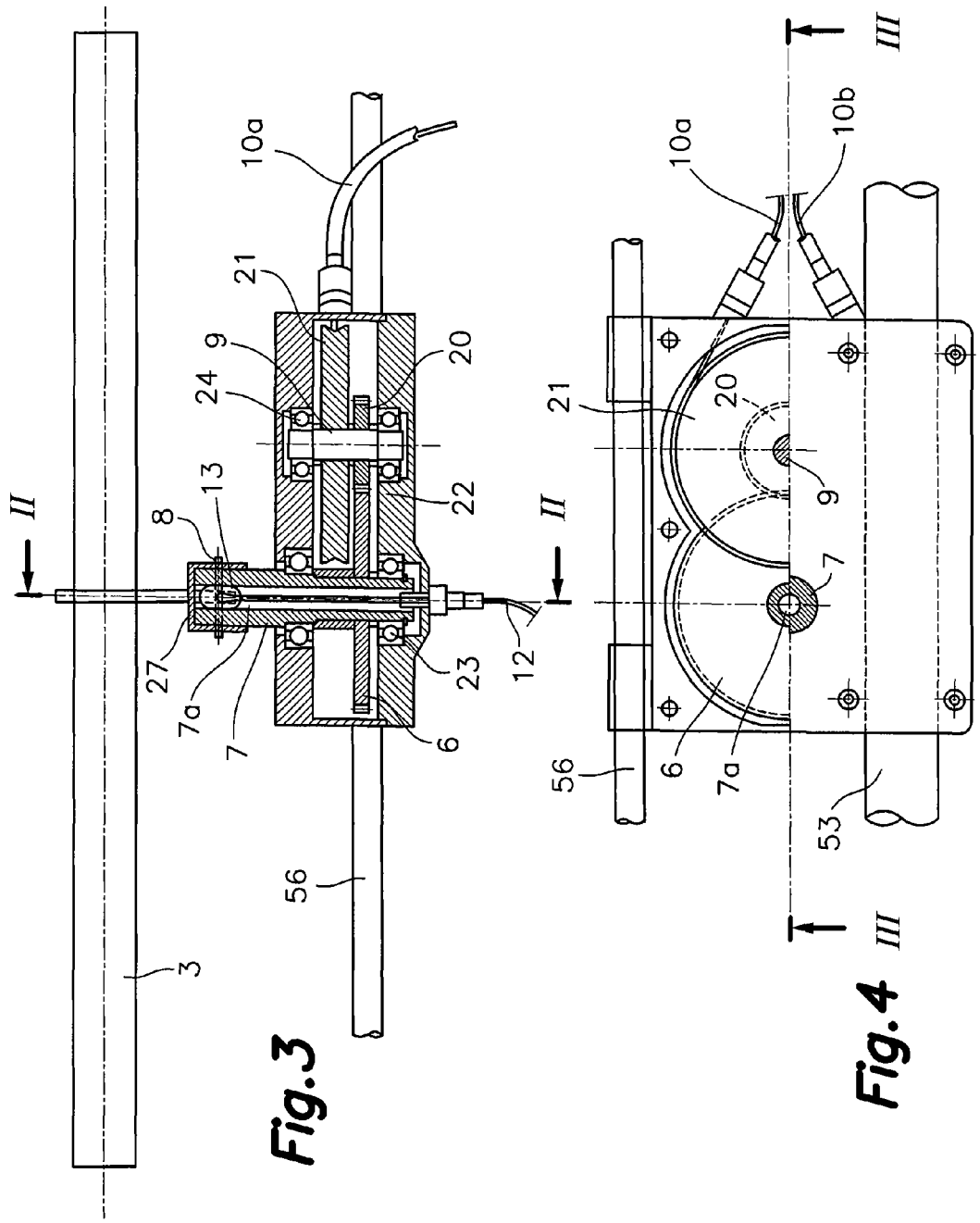

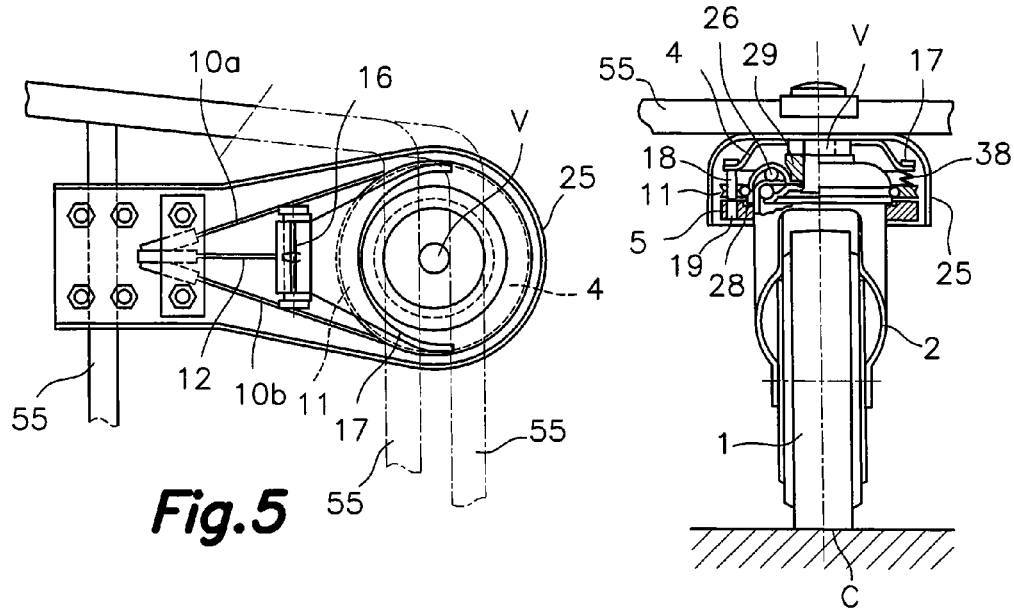
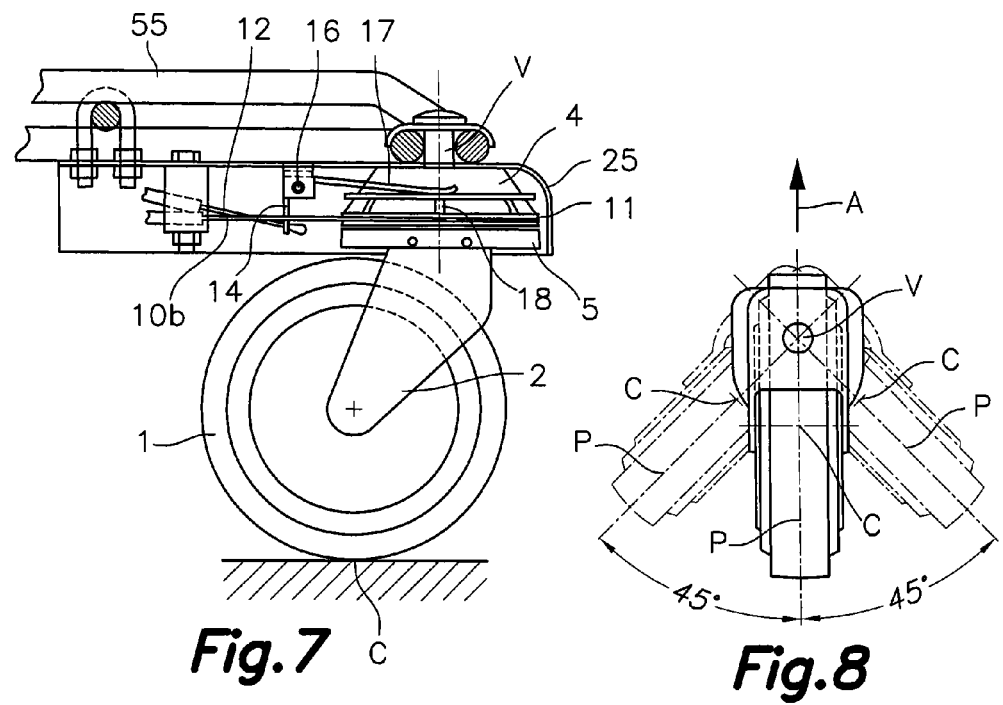

DEVICE FOR THE OPTIONAL GUIDING OF AT LEAST ONE SELF-STEERING WHEEL OF A TROLLEY

CROSS-REFERENCE TO OTHER APPLICATIONS

This application is a Continuation-in-Part (CIP) of U.S. patent application Ser. No. 11/662,785, filed Mar. 14, 2007 which is a U.S. National Phase Application of PCT International Application No. PCT/ES2005/000495, filed Sep. 14, 2005. The contents of this application are incorporated herein by reference.

FIELD OF THE INVENTION

The present invention relates to a device providing means for the guiding of at least one self-steering wheel of a trolley. "Self-steering wheel" is understood as a wheel of the type that is mounted in a support that pivots around a vertical axis shifted from the point of contact of the wheel with the ground, such that said wheel always orients itself according to the direction of the forward movement of the trolley.

The device of the present invention is especially useful for trolleys preferably, though not exclusively, man-operated in which all their wheels are self-steering wheels, such as, for example, trolleys for shopping in supermarkets and department stores, trolleys for carrying clothing or food in hotels and hospitals, hospital beds, etc. However, the device is also useful for man-operated trolleys combining self-steering wheels with fixed-axle wheels, such as trolleys for carrying luggage in stations and airports, and for motorized trolleys provided with at least one self-steering wheel.

TECHNICAL BACKGROUND

The use of man-operated trolleys provided with one or more self-steering wheels has a number of advantages given that a user can steer the trolley in any direction by pushing or pulling it from a push bar or handle provided for such purpose. However, and especially when all the wheels of the trolley are self-steering wheels, certain situations present themselves in which the handling of the trolley is very problematic. For example, when the ground has an inclination in a direction that is transverse to forward movement direction of the trolley, the latter tends to move to the side instead of in a straight line, or when the direction of the front wheels is to be changed by acting on a push bar located at the rear end of the trolley, the latter tends to maintain the previous path though with the trolley turned. Any of these situations is worsened when the trolley is full.

These difficulties cold be lessened if at least one of the wheels of the trolley, preferably a front wheel, could be guided by the user.

Patent document WO 92/10388, with priority date May 12, 1990, discloses a device for the guiding of a trolley provided with self-steering wheels.

Patent EP-A-0701939, with British priority date Sep. 19, 1994, discloses a supermarket trolley comprising a control device for self-steering wheels and a protective rim for the basket.

U.S. Pat. No. 3,190,386, granted on Jun. 22, 1965, describes a motorized supermarket trolley that can be steered and nested together with other similar trolleys. In this case, the trolley includes a double wheel actuated by an electric motor through a transmission.

Patent application ES-A-2153729, filed by the applicant of this document on Nov. 2, 1998, discloses a human-powered trolley comprising a frame, a push bar and wheels, at least one of which is a self-steering wheel. The trolley further includes handles, preferably integrated in a single body, hingedly mounted on the mentioned push bar, which is hollow. The handles are connected to corresponding cables which, passing through the inside of the push bar and other elements of the frame, reach a pulley associated to the rotating fork supporting one of the self-steering wheels. Thus, the wheel pivots in terms of its orientation in response to the movements of the handles. A connecting bar is provided between a crank associated to the supporting fork of the actuated wheel and another crank associated to the supporting fork of another self-steering wheel to make them pivot in unison.

This arrangement has proven to be fully satisfactory in practice in terms of the guiding of a self-steering wheel. However, neither in this patent application ES-A-2153729 belonging to the current applicant nor in the previously mentioned documents WO 92/10388 and U.S. Pat. No. 3,190,386 the possibility of disconnecting the steering members at will is provided so as to allow the free self-steering operation of the wheel. In contrast, the wheel involved is permanently controlled by the steering members, which prevents, for example, a side movement of the trolley. Furthermore, given that this type of self-steering wheel, due to its very construction, is mounted in a support that is able to pivot in relation to a vertical axis shifted from the center of the wheel, or in other words, shifted from the point of contact of the wheel with the ground, the wheel tends to be located behind said vertical axis in relation to the forward movement direction. All the mentioned devices have the steering members mounted in relation to the wheel considering a predetermined forward movement direction. When the trolley is pushed or pulled in a backwards direction, or in a direction opposite to the mentioned predetermined forward movement direction, the wheel connected to the steering members tends to be located in the opposite side of the vertical axis of its support, forcing the mechanism to a point that is beyond the functions it is provided for.

Furthermore, the unisonous guiding of two wheels of the trolley mounted in parallel has a problem insofar as each of them should follow a path with a different radius of curvature, for which purpose each of the wheels would have to pivot variably with a different angle, which is impossible to implement by guiding one of the wheels and having a simple connecting rod to the other wheel. This makes one of the wheels skid in curved paths. In fact, it has been found that the guiding of only one of the wheels is sufficient when the other one is freely self-steering.

Another problem with U.S. Pat. No. 3,190,386 and the mentioned patent application ES-A-2153729 is in relation to the hysteresis of flexible mechanical transmissions, especially using Bowden cable. Indeed, flexible cables as well as their corresponding cable guides, supporting elements, levers, etc., have a certain elasticity that accumulates in the system causing, in addition to considerable loss of efficiency between the drive element and the follower element, an unpleasant sensation of a lack of promptness in response to the steering members.

In addition, patents ES-A-8704020 and U.S. Pat. No. 5,131,517 disclose respective coin-operated locking devices for immobilizing trolleys.

Upon analyzing the background documents mentioned above, it can be deduced that there is a need for a device for guiding at least one self-steering wheel of a trolley with a locking device that can optionally be coupled/uncoupled by the user. Another need is to provide a transmission that is preferably flexible, which prevents, at least in part, the aforementioned hysteresis problem.

DISCLOSURE OF THE INVENTION

The present invention contributes to meet the previous and others needs by providing a device for the optional guiding of at least one self-steering wheel of a trolley, said self-steering wheel being of the type that is mounted in a support that pivots around a vertical axis shifted from the point of contact of the wheel with the ground. The guiding device according to the present invention comprises, in combination, operating means for rotating a first clutch part about said vertical axis in response to a steering member that can be accessed by the user, and actuation means to couple and uncouple at will said first clutch part in relation to a second clutch part solidly connected to the mentioned support of the wheel in response to an operating control that can be accessed by the user, the mentioned coupling occurring only when said first and second clutch parts are in a predetermined mutual angular orientation, such that when the first and second clutch parts are uncoupled, the wheel acts like a freely self-steering wheel, and when the first and second clutch parts are coupled, the orientation of the wheel is controlled by means of said steering member.

The mentioned operating control is integrated in said steering member forming a single lever by way of a handlebar provided with a rotational movement associated to the guiding and with a lowering movement associated to the clutching. By virtue of this arrangement, in order to couple the first and second clutch parts, the user must carry out a sustained lowering actuation of the mentioned steering member combined with a forward movement of the trolley and/or with a rotational actuation of the mentioned steering member. This operation, which seems somewhat complicated through the explanation, is produced intuitively in a natural, virtually involuntary manner without the need for any prior instructions when the trolley is pushed forward through the corresponding handlebar. Forward movement of the trolley can obviously be performed without actuating the steering members, pushing it through the fixed push bar of the trolley.

This arrangement has the advantage over the prior art devices of freely allowing the self-steering actuation of the wheel, which is useful, for example, to perform certain maneuvers in small spaces or to push or pull several trolleys at the same time, especially when they are empty, and to optionally allow the guiding of said self-steering wheel to prevent the side deviation thereof and precisely following curved paths. In summary, the device of the present invention makes use of all the advantages of self-steering wheels and optionally allows eliminating some of their drawbacks.

According to a preferred embodiment, the device of the present invention incorporates a first gear transmission stage to transmit the rotational movement of the handlebar before the mentioned flexible cable transmission. Said gear transmission is a multiplier transmission with a ratio preferably comprised between 1.5:1 and 4:1, whereas the cable transmission ratio between the drive and follower pulleys is 1:1, although other reduction or multiplication ratios would be possible.

With the mentioned previous gear multiplier stage, the run of the cables is considerably increased, whereby the mentioned problem of hysteresis is attenuated, the elastic deformations accumulated in the system are proportionally much less, the mechanical efficiency is improved and the user has a sensation of promptness in the response to the steering member. This multiplier gear transmission further provides an advantageous effect from an ergonomic point of view, given that it allows the user to make sharp turns with the trolley by means of relatively small turns of the handlebar. In contrast, with a direct or reduction transmission, the angle which would be necessary to turn the handlebar to make a sharp turn of the trolley would be so big that the handlebar could take an uncomfortable and even dangerous position.

The device of the present invention may be integrated in newly designed trolleys or it may be provided as an accessory that can be easily installed in existing trolleys. To that end, the device comprises a first casing which houses the first gear transmission stage and on which the guiding member is mounted with its connections to the transmissions, and a second casing which houses the first and second clutch parts and a modified support for the wheel. Both casings are joined only by the flexible transmission cables, which have a length that is suitable for the trolley involved.

It must be pointed out that one embodiment of the device of the present invention is designed so that it can be implemented in existing trolleys of the nestable type, i.e. able to be fitted inside one another to reduce their space when they are inactive, without such property being prevented. Therefore, the first casing is mounted on the fixed push bar of the trolley, the second casing is mounted on a support of the wheel to be controlled, and the cables are discreetly held along the struts of the frame of the trolley. The second casing preferably includes a complete modified wheel and support assembly which substitutes the original wheel and support assembly of the trolley without the dimensions of said second casing preventing the mentioned nesting capability. Furthermore, the device optionally provides a coin-actuated locking device integrated in said first casing for immobilizing the trolley. This locking device is a conventional-type device and the fact that it is integrated in the first casing reduces the number of elements fixed to the push bar and provides a more harmonious appearance.

BRIEF DESCRIPTION OF THE DRAWINGS

The foregoing and other features and advantages will become more evident from the following detailed description of exemplary embodiments of the invention with reference to the accompanying drawings, in which:

FIG. 3 is a cross-section view of the first casing of the device taken through the plane III-III of FIG. 4;

FIG. 4 is a partially sectioned plan view of the first casing of the device according to an exemplary embodiment of the invention;

FIG. 5 is a plan view of the second casing of the device according to an exemplary embodiment of the invention;

FIGS. 6 and 7 are partially sectioned front and side elevational views, respectively, of the second casing of the device according to the exemplary embodiment of FIG. 5;

FIG. 8 is a plan view of the self-steering wheel controlled by the device of the present invention which illustrates an angular range within which it is possible to connect the steering member;

DETAILED DESCRIPTION OF EXEMPLARY EMBODIMENTS

Figure 1:
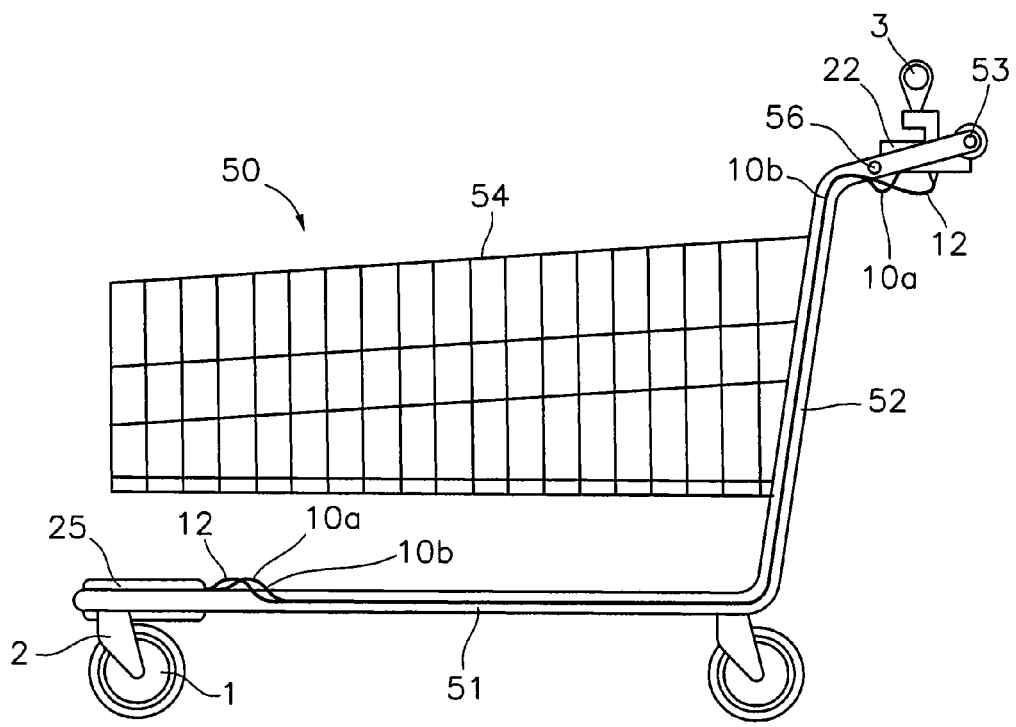
FIG. 1 is a side elevational view of a supermarket trolley on which the device of the present invention is mounted.

First in reference to FIG. 1, the device of the present invention is useful for the optional guiding of at least one self-steering wheel 1 of a trolley 50. In the illustrated example, the trolley 50 is a typical nestable, man-operated supermarket trolley comprising a base frame 51 that is substantially parallel to the ground, under which frame four wheels are mounted, all of them being self-steering wheels. A frame 52 ending in a fixed push bar 53 rises up from the rear part of the mentioned base frame to push the trolley. The frame 52 supports a basket 54 provided with a rear foldable face (not shown) which allows the nesting of similar trolleys in the rear parts of others for the purpose of reducing their space when they are inactive.

As is best shown in FIG. 7, the self-steering wheel 1 (like the other three) is of the type that is mounted in a support 2, which typically includes a fork, that pivots around a vertical axis V shifted from the point of contact C of the wheel 1 with the ground. Therefore a force applied against the trolley in any direction is transmitted to the vertical axis V and causes a moment in relation to the mentioned point of contact C with the ground causing the automatic orientation of the wheel in relation to the direction of the force applied to the trolley, the point of contact C with the ground always being behind the vertical axis V.

According to FIG. 1, the device of the invention comprises a first compact casing 22 fixed on the mentioned fixed push bar 53 solidly connected to the frame 51, 52 of the trolley, eventually supported on another close cross-member 56 of the frame, and a second compact casing 25 fixed at one end of the base frame 51, above the wheel 1 to be controlled. A steering member 3 provided with a dual articulation about two axes is mounted on the first casing 22. The mentioned steering member 3 is connected through transmissions housed in part in the first casing 22 to transmit its movements to clutching and pulling members for clutching and pulling the support 2 of the wheel 1 housed in the second casing 25. The mentioned transmissions include a gear multiplier stage housed in the casing 22, and flexible cables 10a, 10b, 12 arranged between the casing 22 and the casing 25. The cables 10a, 10b, 12 are discreetly fixed in struts of the frame 51, 52.

More specifically (and as shown in the group of FIGS. 1 to 8), a first transmission which includes the mentioned gear stage 6, 20 and a further dual cable transmission 10a, 10b serves for rotating a first clutch part 4 about said vertical axis V of the support 2 of the wheel 1 in response to the steering member 3, whereas a second transmission including a single cable 12 serves to couple and uncouple at will said first clutch part 4 in relation to a second clutch part solidly connected to the mentioned support 2 of the wheel 1 in response to an operating control integrated in said steering member 3. The mentioned coupling is done only when said first and second clutch parts 4, 5 are at a predetermined mutual angular orientation, such that when the first and second clutch parts 4, 5 are uncoupled, the wheel 1 acts like a freely self-steering wheel, and when the first and second clutch parts 4, 5 are coupled, the orientation of the wheel 1 is controlled by means of said steering member 3.

Figure 2:
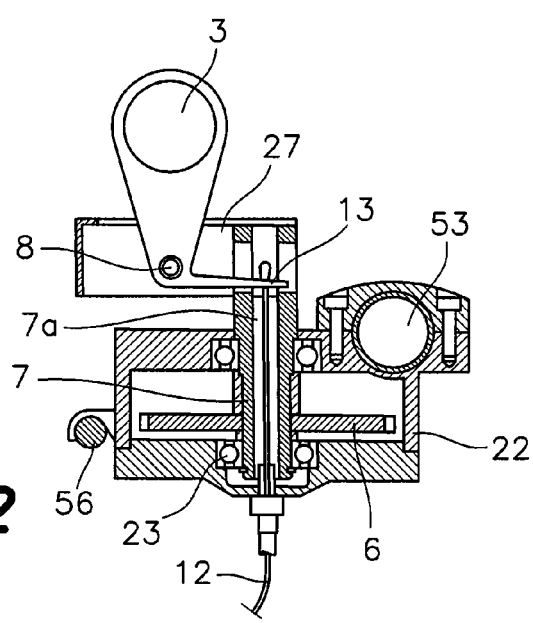
FIG. 2 is a cross-section view of the first casing of the device taken through the plane II-II of FIG. 3.

Referring now to FIGS. 2 to 4, the steering member 3 is a manually operated mechanical member, by way of a handlebar, mounted on a support 27 solidly fixed to a portion of a substantially vertical first shaft 7 projecting from the first casing 22. The rotation on the first shaft 7 constitutes a first articulation of the steering member 3. Therefore, by acting on said steering member 3 the mentioned first shaft 7 is rotated a certain angle in both directions.

The first casing 22 houses bearings 23 for supporting and guiding the first shaft 7, an inner portion of said first shaft 7 with a drive gear wheel 6 fixed thereto, bearings 24 for supporting and guiding a countershaft 9 and the countershaft 9 itself to which a follower toothed pinion 20 and a drive pulley 21 are fixed. It will be seen that the gear transmission 6, 20 is a multiplier transmission with a transmission ratio comprised between 1.5:1 and 4:1. The mentioned drive pulley 21 is connected to a flexible transmission comprised of the mentioned double cable 10a, 10b transmitting the rotational movements of said countershaft 9, and subsequently of the first shaft 7 actuated by the steering member 3, to said first clutch part 4 (FIGS. 5 to 7), making it rotate.

The steering member 3 further incorporates the functions of said operating control for operating the clutch. To that end, the steering member 3, by way of a handlebar, is mounted on the mentioned support 27 such that it is able to rotate about a second shaft 8, substantially perpendicular to the first shaft 7 and parallel to the steering member 3. The rotation on the second shaft 8 constitutes a second articulation connected to a second flexible single cable transmission 12. Both rotations of steering member 3 about the shafts 7 and 8 of the first and second articulations can be carried out simultaneously or separately, whatever the angular position of the steering member 3 may be about either of the first and second shafts 7 and 8. Therefore, the steering member 3 is provided with a rotational movement in a plane that is substantially parallel to the ground to control the orientation of the wheel 1, and with a lowering movement to carry out the connection of the first and second clutch parts 4, 5.

The second shaft 8 is arranged in the support 27 such that it is shifted from the vertical of the first shaft 7, which is hollow. The mentioned operating control for operating the clutch comprises a drive lever 13 solidly connected to the steering member 3 and which projects from the articulation point of the second shaft 8 until an active end of said lever 13 is located above the upper end of the hollow shaft 7. The cable 12 of the second mechanical transmission passes through the mentioned hollow inside 7a of said first shaft 7 and is fixed to the mentioned active end of the drive lever 13. The cable 12 transmits a lowering movement of said steering member 3 about the second shaft 8 to said first clutch part 4, making it move axially between an uncoupled position and a coupled position in relation to said second clutch part 5 solidly connected to the support 2 of the wheel 1. The device includes elastic means 38, incorporated either in the transmission means 12 and/or in the first and second clutch parts 4, 5, which operate to return the first clutch part 4 to said uncoupled position when the steering member 3 is not acted on to make it rotate on the second shaft 8.

Given that the mentioned trolley 50 is a man-operated trolley, the steering member 3 can further advantageously act as a push bar of the trolley 50, as an alternative to the mentioned fixed push bar 53. Therefore, a pushing force applied on the steering member 3 causes a turning moment about the second shaft 8 of the second articulation, which moment is transmitted through the second cable transmission 12 carrying out the coupling of the first and second clutch parts 4, 5 making the guiding of the wheel 1 possible in response to the movements of the steering member 3 about the first shaft 7 transmitted by the first transmission comprised of gears 6, 20 and double cable 10a, 10b. In other words the mere fact of pushing the trolley 50 forwards by means of a force applied on the steering member 3 automatically actuates the guiding device of the wheel 1. In contrast, if the force applied on the steering member 3 is a pulling force, the second cable transmission 12 does not act and the mentioned elastic means maintain the first and second clutch parts 4, 5 uncoupled, whereby the wheel 1 acts like a freely self-steering wheel.

Referring now to FIGS. 5 to 7, there is shown the mentioned second compact casing 25, fixed to members 55 of the base frame 51 of the trolley 50. The casing 25 houses bearings 26 for guiding the support 2 of the wheel 1 about the vertical axis V; the mentioned first and second clutch parts 4, 5; a follower pulley 11 of the second transmission; and a lever and fork 14, 17 assembly of the first transmission. The second casing 25 is connected to the first casing 22 only through the cables 10a, 10b and 12 of the first and second flexible mechanical transmissions, respectively.

The mentioned cables 10a, 10b of the first flexible transmission transmit the movements from said drive pulley 21 solidly connected to said countershaft 9 (FIGS. 2 to 4) to said follower pulley 11, which is mounted by means of either a ball or friction bearing 20 on a base part 29 fixed to the vertical axis V (FIG. 6), such that said pulley 11 can rotate freely about said vertical axis V. On the other part, said first clutch part 4 is mounted such that it is able to perform a rotational movement about the vertical axis V and a translational movement along the same, said translational movement being carried out between the mentioned uncoupled and coupled positions. The support 2 of the wheel 1 is mounted by means of a double ball bearing 26 also on the base part 28 solidly connected to the vertical axis V and the second clutch part 5 is solidly connected to said support 2 of the wheel.

The first clutch part 4 comprises a coupling pin 18 projecting at its lower part parallel to the vertical axis V. This coupling pin 18 is passed through a through hole of the follower pulley 11, such that the first clutch part 4 is linked to the follower pulley 11 in terms of its rotational movements without said first clutch part 4 being prevented from carrying out its axial movements along the vertical axis V. By virtue of a downward axial movement of the first clutch part 4, the coupling pin 18 is able to project at the lower part of the follower pulley 11 and be introduced in a coupling hole 19 of the second clutch part 5, carrying out the coupling of both clutch parts 4, 5.

To that end, the first clutch part 4 is pushed against the second clutch part 5 by means of the mentioned lever and fork assembly 14, 17 connected to the first cable transmission 12, and shown in detail in FIGS. 5 and 7.

The mentioned cable 12 of the second flexible transmission transmits the movements from the end of said drive lever 13 solidly connected to the steering member 3 (FIGS. 2 and 3) to a follower lever 14 (FIG. 7) mounted in an articulated manner in relation to the trolley 50 through a horizontal pivot 16 close to said wheel 1. The follower lever 14 is solidly connected to a fork 17 provided with arms encompassing said first clutch part 4 at the upper part such that a lowering movement of the follower lever 14 translates into a downward movement of the arms of said fork 17, which axially push said first clutch part 4 towards the second clutch part 5 along the vertical axis V and against the force of the mentioned elastic means, thereby causing the coupling of the first and second clutch parts 4, 5.

Preferably, there is compression spring (not shown) arranged around a portion of the cable 12 between an enlarged terminal thereof and the lever 14, said compression spring being able to absorb the run of the cable 12 until a rotation of the first clutch part 4 and/or of the second clutch part 5 allows the fitting of the second clutch part 5 in the notch 39.

The first clutch part 4 has a single coupling pin 18 whereas the second clutch part 5 has a single anchoring hole 19, therefore the mentioned coupling there between occurs only when they are mutually at a predetermined relative angular position in which the coupling pin 18 and the anchoring hole 19 coincide aligned with one another. The mentioned predetermined mutual angular position of the first and second clutch parts 4, 5 occurs only at an angular range selected such that their coupling is possible only when the trolley moves forwards, for the purpose of preventing excessive forces on the transmissions when the trolley is pulled in the opposite direction.

FIG. 8 shows said angular range in which the connection of the clutch means is possible; such connection occurs when said point of contact C of the wheel 1 with the ground is behind the vertical axis V in relation to the forward movement direction A straight ahead and a plane P determined by the vertical axis V, and the point of contact C of the wheel 1 with the ground is within an angular range of at least ±45°, possibly reaching ±75° or more, in relation to a vertical plane parallel to the longitudinal axis of the trolley 50, which coincides in this case with the forward movement direction A straight ahead. The user can easily connect the first and second clutch parts 4, 5 by means of a sustained actuation of the mentioned operating control for operating the clutch, for example, by pushing the trolley forwards through the steering member 3, combined with the forward movement itself of the trolley 50, to orient the wheel 1 in the suitable direction and/or a rotational actuation of the mentioned steering member 3 about the first shaft 7 of the first articulation.

For a person skilled in the art it will be obvious that the essence of the present invention is based on the mentioned combination of steering means for a self-steering wheel with clutch means that can optionally be actuated by the user, such that the wheel involved may optionally be controlled by the user or it can act in a freely self-steering manner. Subsequently, a steering and clutch arrangement including first and second clutch parts 4 and 5 as described in relation to FIGS. 5 to 7 could be actuated by any operating and actuation means different from those described in relation to FIGS. 1 to 4 without affecting the essence of the present invention.

Figure 9:
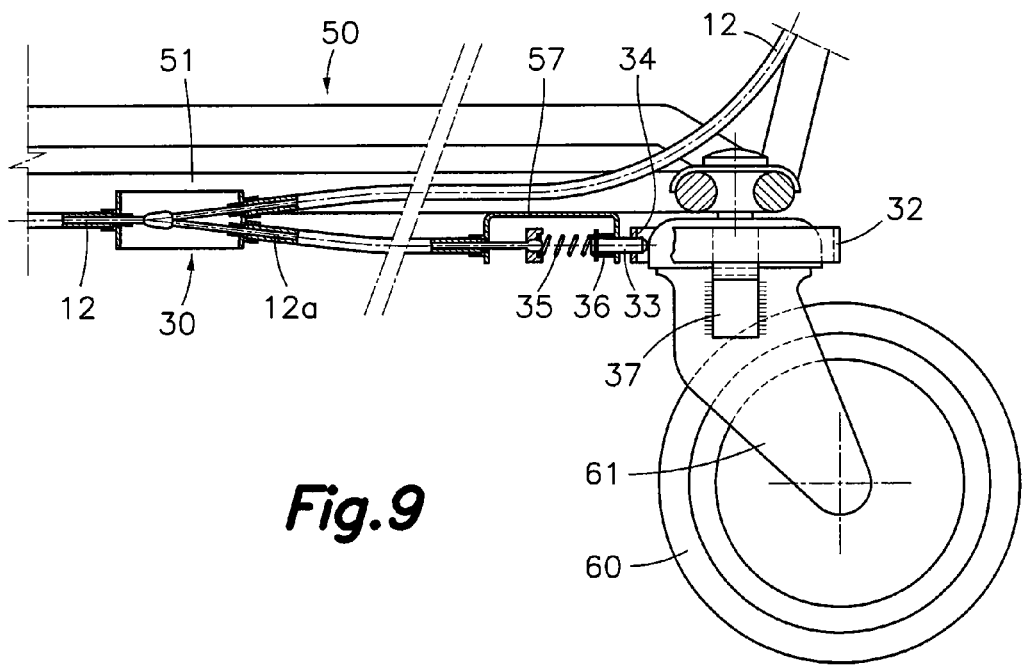
FIGS. 9 and 10 are partially sectioned side elevational views of a mechanism for fixing the orientation of a rear wheel, according to an exemplary embodiment of the invention, in locked and unlocked positions, respectively.
Figure 10:
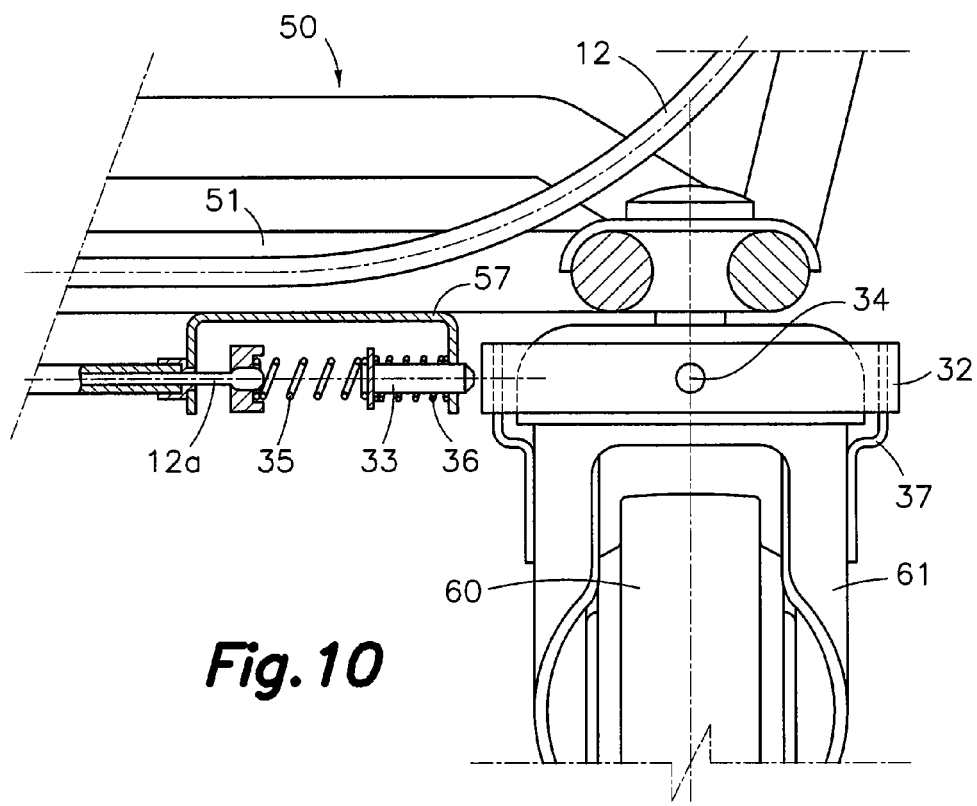

As shown in FIGS. 9 and 10, the device according to the present invention optionally includes, especially when the controlled self-steering wheel 1 is a front wheel of the trolley 50; a small mechanism 33, 34 for immobilizing a support 61 of at least one rear self-steering wheel 60 of the trolley 50 in a predetermined orientation simultaneous with the actuation of the clutch of said controlled front self-steering wheel 1. Therefore, provided that the user uses the guiding device pushing and rotating the steering member, he or she will have steering control of at least one front wheel while at least one rear wheel is maintained in a fixed orientation, which in combination determines the direction of the trolley.

To that end, the mentioned second flexible cable transmission 12 includes a branch 30 from which a branch cable 12a starts in such a direction that said branch cable 12a is pushed when the second cable 12 is pulled. This branch cable 12a is used to actuate the mentioned mechanism 33, 34, which comprises a pin 33 mounted in a support 57 joined to the trolley 50 such that it can axially move to be coupled in a hole 34 existing in a part 32 solidly connected to said support 61 of the mentioned rear self-steering wheel 60. Part 32 has the form of a cylindrical wall supported coaxially to the vertical rotation axis of the support of the wheel 60 by a pair of arms 37 joined to the support 61. The pin 33 is connected to an enlarged terminal of the end of the branch cable 12a by means of a first spring 35 and is pushed towards a locked position (FIG. 9) by a movement of the branch cable 12a transmitted by said first spring 35. A second spring 36 having less force than the first one pushes the pin 33 towards an unlocked position (FIG. 10) when the branch cable 12a is withdrawn. Therefore, when the cable 12 is pulled due to the action of the user on the clutch control 13, the branch cable 12a is pushed and the pin is moved towards the locked position (FIG. 9) against the force of the second spring 36. The locking occurs when the self-steering of the rear wheel 60 places hole 34 opposite to pin 33, the run of the branch cable 12a being absorbed by the first spring 35 until this occurs. When the user stops acting on the clutch control 13, the second cable 12 looses tension, dragged by the mentioned elastic means 38 of the clutch, such that the branch cable 12a is withdrawn, allowing the return of the pin 33 to its unlocked position (FIG. 10) due to the force of the second spring 36.

This locking mechanism of the direction of a rear wheel is mainly useful in trolleys in which the steering member 3 has the form of a single-control lever suitable for being actuated by a single hand, for example for the handicapped, instead of being in the form of a handlebar, which requires both hands to be actuated.

Figure 11:
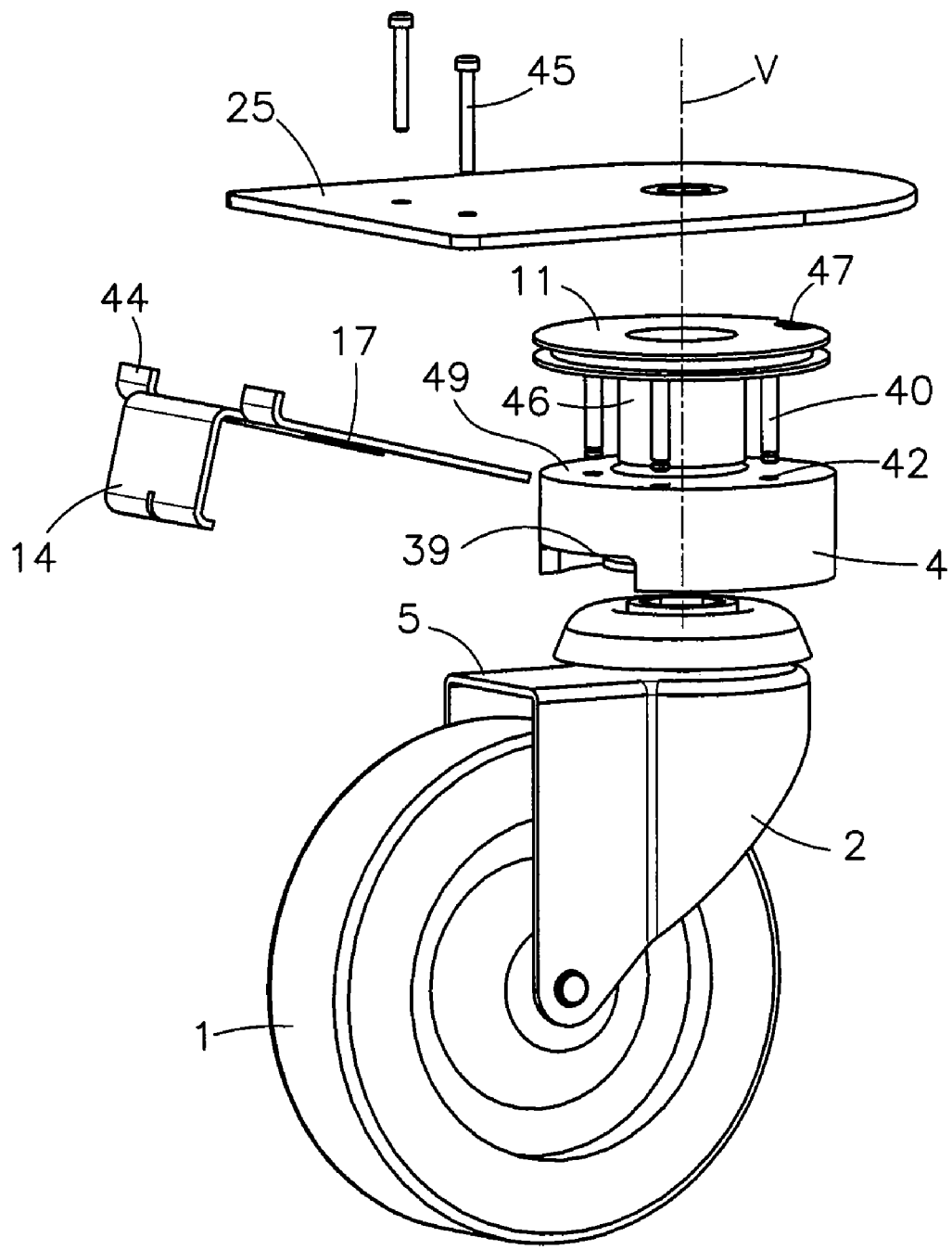
FIG. 11 is a partially exploded perspective view of the second casing of the device according to another preferred exemplary embodiment of the invention.
Figure 12A:
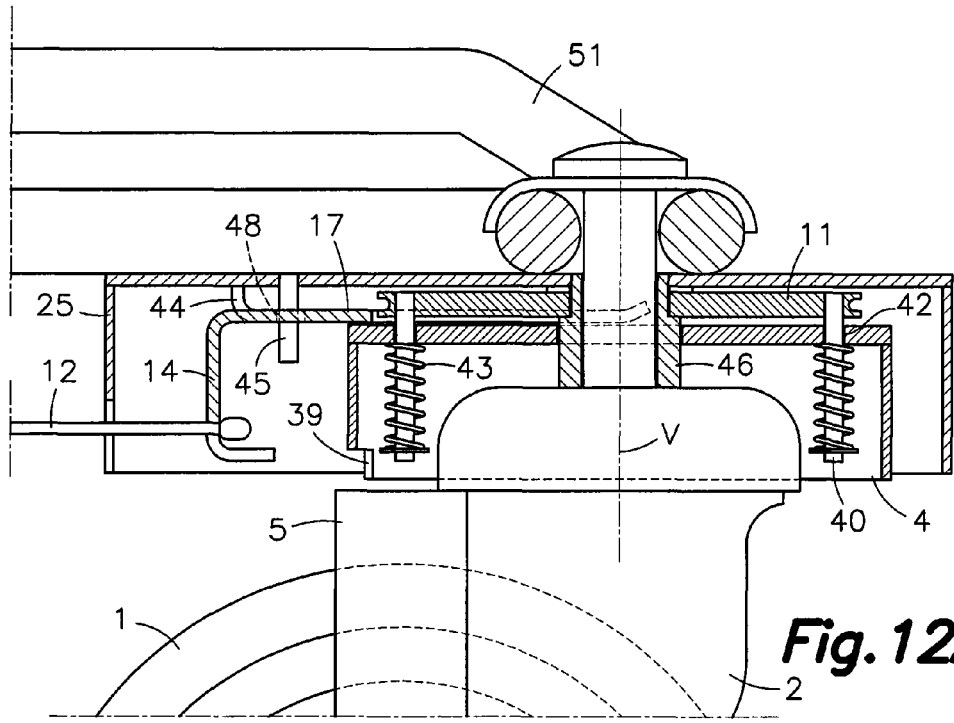
FIGS. 12A and 12B are partial cross-section views of the second casing of FIG. 11, in uncoupled and coupled positions, respectively.
Figure 12B:
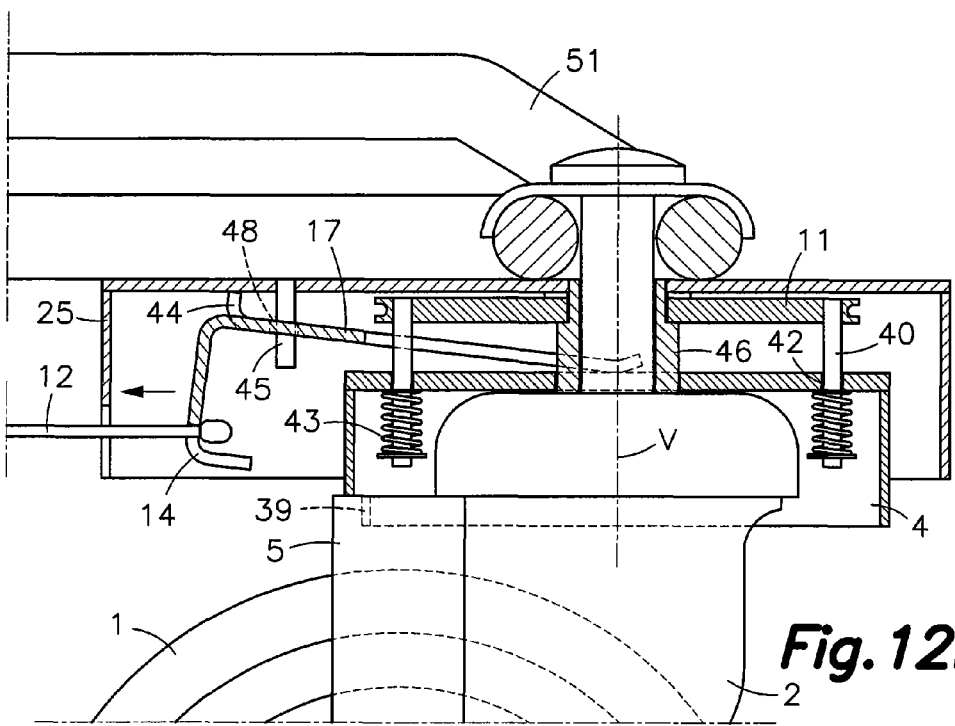
Figure 13:
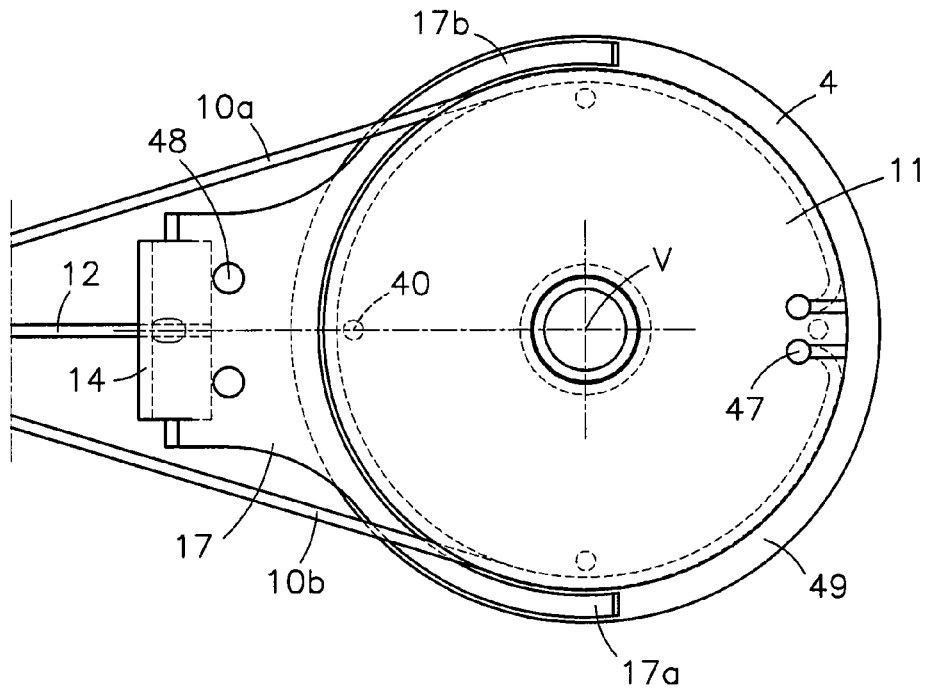
FIG. 13 is an upper view of the second casing of FIG. 11, from which some parts have been omitted for greater clarity.

Now in reference to FIGS. 11 to 13, there is shown a preferred exemplary embodiment in which the support 2 of the wheel 1 and the mentioned second clutch part 5 are integrated in one common part comprising a lower section 2 shaped, for example, as a fork so as to rotationally support the wheel 1, and an upper section 5 configured to couple in a notch 39 formed in the first clutch part 4 when said actuation means are actuated. The follower pulley 11 is mounted such that it can rotate about the vertical axis V, but it cannot slide along the same as a result, for example, of a step formed in a sleeve 46 inserted around the vertical axis V. The mentioned follower pulley 11 has anchoring configurations 47 in which enlarged terminals of the cables 10a, 10b are coupled. Therefore, pulling on one of the cables 10a, 10b and loosening the other one due to a rotation of the steering member 3 causes a rotation of the follower pulley 11.

The first clutch part 4 is mounted such that it can slide along the vertical axis V and rotate in relation thereto integrally with the follower pulley 11. To that end, pins 40 fixed to a lower part of the follower pulley 11 are inserted in a sliding manner in corresponding holes 42 of the first clutch part 4, such that the first clutch part can also slide along of said pins 40. The device further comprises elastic members 43, for example in the form of compression springs, arranged around the pins 40 so as to push the first clutch part 4 towards an uncoupled position shown in FIG. 12A, in which said second clutch part 5 (i.e. the upper section 5 of the support fork for supporting the wheel 1) does not interfere with said notch 39. The cable 12 of the second mechanical transmission transmits the lowering movements of the steering member 3 to a lever 14 connected to a fork 17 arranged to push the first clutch part 4 and move it along the vertical axis V against the force of said elastic members 43 from the mentioned uncoupled position (FIG. 12A) to a coupled position, shown in FIG. 12B, in which the upper section 5 is coupled in the notch 39.

In this preferred embodiment, the lever 14 and fork 17 are integrated in a single part, as best shown in FIG. 13, including configurations 44 which rest on an inner surface of the second casing 25 so as to determine a fulcrum, and orifices 48 through which pins 45 solidly connected to the second casing 25 are loosely inserted. This arrangement avoids having to incorporate a shaft and corresponding supports for the rotation of the lever 14. The first clutch part 4 has an upper surface 49 having a diameter that is greater than the diameter of the follower pulley 11, and the fork 17 has arms 17a, 17b resting against a ring-shaped portion of said upper surface 49 of the first clutch part 4 projecting from the follower pulley 11.

Figure 14:
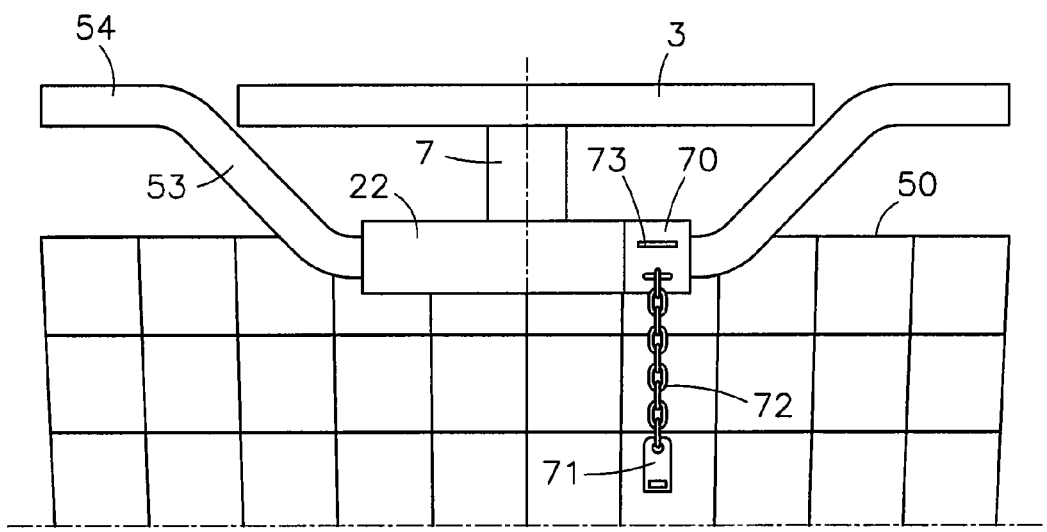
FIG. 14 is a schematic rear elevational view showing the arrangement of the first casing according to another preferred exemplary embodiment of the present invention.

Referring now to FIG. 14, the trolley 50 includes a coin-operated locking device 70 for immobilizing the trolley. According to a preferred embodiment, this locking device 70 is integrated in the mentioned first casing 22 fixed to the push bar 53. The coin-operated locking device 70 is a conventional type and comprises an anchoring part 71 held by a chain 72 or another flexible traction element, and a first slot (not seen in FIG. 4 as it is on an opposite side of the first casing 22) to receive the insertion of a similar anchoring part 71, but attached to an adjacent trolley or to another structure. The locking device 70 includes an immobilization mechanism to trap and immobilize in said first slot a similar anchoring part 71 but attached, for example, to a trolley from a row of trolleys nested together. The mentioned immobilization mechanism can be released by means of inserting a coin in a second slot 73 provided for such purpose. A series of trolleys can thereby be fitted or nested to one another and immobilized among one another, and the anchoring part 71 attached to a trolley can be used to immobilize the following trolley.

Preferably, as is shown in FIG. 14, the push bar 53 is shaped such that end portions 54 thereof, acting as handles, are substantially aligned with the control member 3 when the latter is in a neutral stand-still position.

Figure 15:
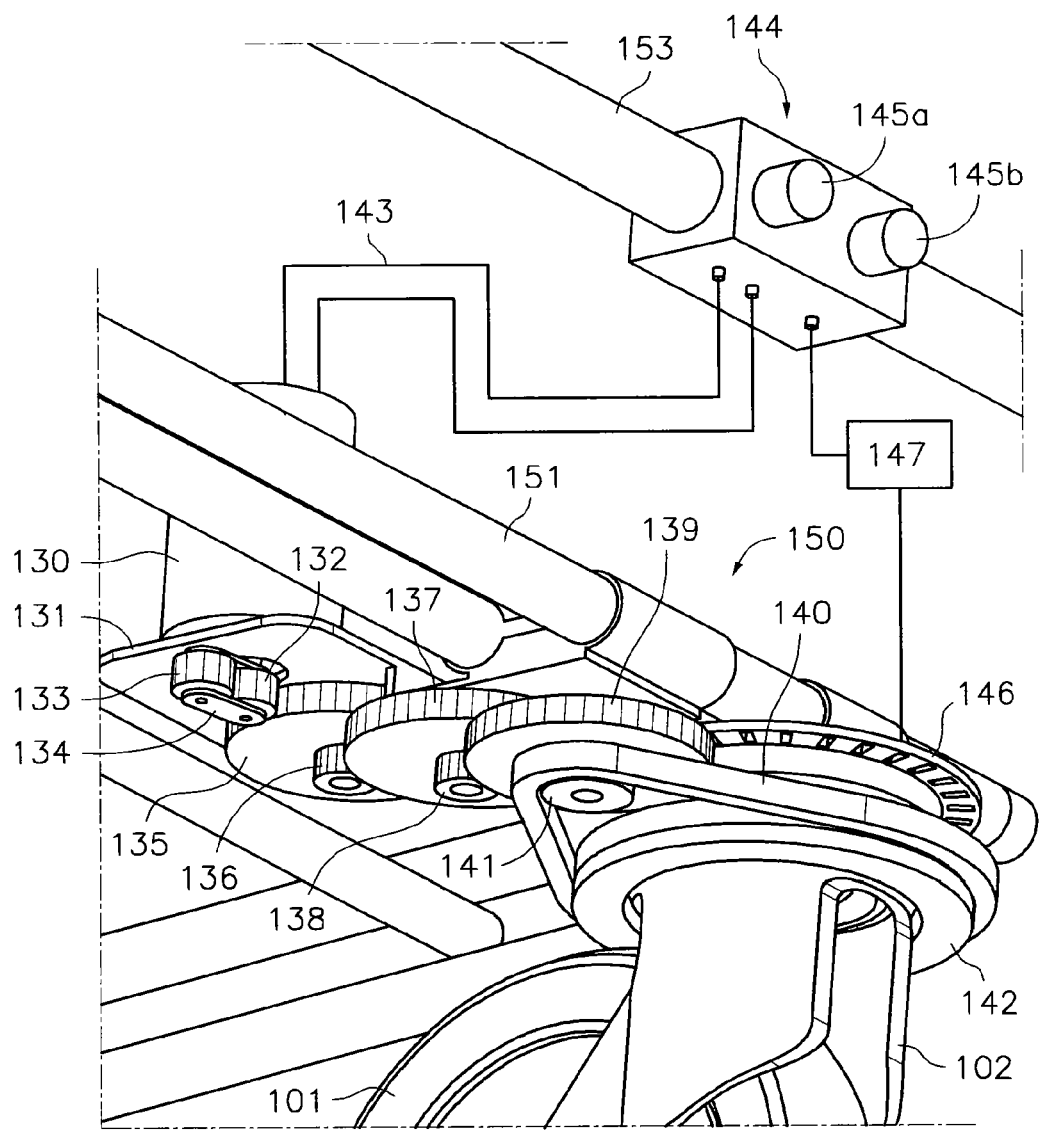
FIG. 15 is a partial perspective view of a device for optionally guiding of at least one self-steering wheel of a trolley according to still another preferred exemplary embodiment of the present invention.

FIG. 15 shows still another exemplary embodiment of the device of the present invention, which is useful for the optional guiding of one self-steering wheel 101 of a trolley 150 comprising a base frame 151 and a push bar 153 only partially shown in FIG. 15. The self-steering wheel 101 is mounted on a support 102 pivotingly connected to the base frame 151 of the trolley 150 such that the support 102 can freely pivot around a vertical axis shifted from the point of contact of the wheel with the ground.

An electric motor 130 is installed on a support plate 131 rigidly connected to the base frame 151 of the trolley 150 relatively near to the self-steering wheel 101. The output shaft of said electric motor 130 is connected to a first pinion 132 which is permanently meshed with a second pinion 133 mounted on a bracket 134 which can freely pivot about said output shaft of the electric motor 130. The axis of both first and second pinions 132, 133 are mutually parallel and also parallel to the vertical axis about which the support 102 of the wheel 101 pivots. The first and second pinions 132, 133 and the bracket 134 form a first clutch part.

A gear wheel 135 is mounted on said plate support 131 to rotate about an axis parallel to the output shaft of the electric motor 130. The gear wheel 135 is spaced apart from the first pinion 132 such that gear wheel 135 is not meshed with the first pinion 132. The gear wheel 135 forms a second clutch part.

A mechanical transmission is arranged to transmit rotation from the gear wheel 135 to the support 102 of the wheel 101.

In the illustrated example, said mechanical transmission comprises a reducing gear train 136-139 and a last reducing step performed by belt 140 mounted on pulleys 141 and 142. Other alternative mechanical transmission will readily occur to one skilled in the art without departing from the scope of the present invention.

The electric motor 130 is energized from a battery (not shown) or the like carried on the trolley 150, and is connected via wiring 143 to an electric control device 144 attached for example to the push bar 153 of the trolley 150. Said electric control device 144 comprises two push-buttons 145a, 145b or the like located to be comfortably actuated by a user who pushes the trolley. In the illustrated example, the two push-buttons 145a, 145b are placed side by side to be alternately pushed for example with the thumb or other finger of one user's hand. Alternatively, the two push-buttons 145a, 145b can be spaced from one another to be alternately pushed with the thumbs or other fingers of both user's hands.

While the push-buttons 145a, 145b are not actuated, the electric motor 130 is not energized and the second pinion 133 remains separated from the gear wheel 135 and the wheel 101 is a freely self-steering wheel. However, the friction in the reducing mechanical transmission is enough to impose a certain restriction in the rotation of the support 102 of the wheel 101 so as to tend to maintain the position.

When a first one of the push-buttons 145a is actuated by the user, the electric motor 130 is energized to rotate in a first direction such that the first pinion 132 makes the second pinion 133 rotate in an opposite direction, and at the same time frictional forces make the bracket 134 rotate in said first direction causing the second pinion 133 to abut and mesh with the gear wheel 135 at one side thereof. Thus, upon actuation the first push-button 145a, the rotation of the electric motor 130 in the first direction makes the first clutch part (first and second pinions 132, 133 and bracket 134) engage the second clutch part (gear wheel 135) and the support 102 of the wheel 101 rotate in a first direction via mechanical transmission to steer the wheel 101.

When the second one of the push-buttons 145b is actuated by the user, the electric motor 130 is energized to rotate in an opposite second direction such that the first pinion 132 makes the second pinion 133 rotate in an opposite direction, and at the same time frictional forces make the bracket 134 rotate in said second direction causing the second pinion 133 to abut and mesh with the gear wheel 135 at another side thereof. Thus, upon actuation the second push-button 145a, the rotation of the electric motor 130 in the second direction makes the first clutch part (first and second pinions 132, 133 and bracket 134) engage the second clutch part (gear wheel 135) and the support 102 of the wheel 101 rotate in a second direction via mechanical transmission to steer the wheel 101.

An encoder 146 is connected to the support 102 of the wheel 101 to send a signal representative of the angular position of the support 102 of the wheel 101 with respect the base frame 151 of the trolley 150 to electronic control means 147 in connection with the electric motor 130.

By way of example, three different alternative embodiments not shown in the drawings are proposed below for motorizing the operating and actuation means, one using electric power, another one using hydraulic power and a third one using pneumatic power.

In the electric powered embodiment, the mentioned steering member and said clutch control can comprise electrical buttons located in a place of the trolley 50 that can be accessed by the user, for example in the mentioned fixed push bar 53, one on the left side and one on the right side, such that they can be comfortably be actuated with the thumb of each hand. These buttons would eliminate the steering member 3 by way of a handlebar present in the mechanical version described in relation to FIGS. 1 to 4. For their part, the operating and actuation means can comprise a pair of electric motors located close to the wheel 1 and provided with suitable transmissions to selectively actuate, at the request of the mentioned buttons, the mentioned axial movement of the first clutch part 4 and the mentioned rotational movement of said first clutch part 4, respectively. A type of transmission suitable for either the rotation and linear movements could include a rack articulated to the end of a follower lever, said rack being meshed in a pinion or worm screw fixed to the output shaft of the corresponding electric motor. It would also be possible to use solenoids connected to said levers, or a combination of a solenoid and a motor for the clutch and the steering, respectively. The device would include a rechargeable battery to provide power to the electric motors through suitable electrical wiring connected to said buttons.

Optionally, an electric device, such as a position detector, located in relation to the vertical axis V of the support 2 of the wheel 1, would act so as to allow the actuation of the electric motor responsible for the rotation of the part of clutch 4 only when the wheel 1 is in the mentioned predetermined orientation in relation to the trolley 50, i.e. within the angular range shown in FIG. 8. A device to perceive the rotation of the wheel 1 may also optionally be arranged so as to allow the actuation of the motor or motors only when the trolley is moving, for the purpose of saving energy in unnecessary movements which furthermore consume greater energy since the trolley is stopped.

In the hydraulic powered embodiment, the steering member and clutch control also comprise buttons located in a place of the trolley 50 that can be accessed by the user. These buttons would actuate hydraulic valves. In this example, the operating and actuation means would comprise a hydraulic recipient that is able to store a fluid under pressure connected to a hydraulic pump actuated by the rotational movement of at least one of the wheels of the trolley and able to provide pressure to a said hydraulic recipient. If the trolley had one or more wheels mounted on a fixed position shaft, the hydraulic pump would be arranged on the frame of the trolley and a transmission, for example a belt or roller chain transmission, would transmit the rotational movement of said wheel or fixed shaft to the pump. If all the wheels of the trolley were self-steering, the hydraulic pump would be fixed to the support or fork of one of the wheels and fluid communication would be established with the tank through flexible piping and connections which allow the rotation of said support about its vertical axis. To actuate the mentioned axial movement of the first clutch part 4 and the mentioned rotational movement of said first clutch part 4 hydraulic cylinders connected to corresponding follower levers, or hydraulic motors provided with rack transmissions similar to those described in relation to the electric power embodiment, or a combination thereof would be provided. An arrangement of fluid conduction pipes would be provided to connect the motors and/or cylinders with the mentioned tank and with the valves to actuate the steering and clutch mechanisms upon request of said buttons.

In the pneumatic powered embodiment, buttons located in a place of the trolley 50 that can be accessed by the user would actuate pneumatic valves so as to selectively give passage to air under pressure coming from one or more compressed air storage cartridges through a suitable arrangement of conduction pipes to one or more pneumatic actuators, such as cylinders or rotational devices, mechanically linked to the first clutch part 4 to move it linearly from the uncoupled position to the coupled position in relation to the second clutch part 5, and to rotate in this position the first clutch part 4 together with the second clutch part 5 for the purpose of controlling the orientation of the wheel 1. Advantageously, the compressed air cartridges could be refillable, the empty cartridges being replaced in the trolley with other previously filled cartridges.

In these two hydraulic and pneumatic powered embodiments a device could also optionally be arranged located in relation to the vertical axis V of the support 2 of the wheel 1 so as to allow the actuation of the cylinders, motors or actuators only when the wheel 1 is in the mentioned predetermined orientation in relation to the trolley 50 and a sensor device so as to allow the actuation of the system only when the trolley 50 is moving.

Having sufficiently described the invention so that a person skilled in the art may carry it out to practice, it is hereby stated that multiple variations on the described exemplary embodiments are possible which would fall within the scope of the present invention as defined by the following claims.

The invention claimed is:

1. A device for the optional guiding of at least one self-steering wheel of a trolley, said self-steering wheel being of the type that is mounted in a support that pivots around a vertical axis shifted from the point of contact of the wheel with the ground, said device for the optional guiding comprising:
   operating means for rotating a first clutch part about an axis parallel to said vertical axis in response to a steering member that can be accessed by the user; and
   actuation means to couple and uncouple said first clutch part to a second clutch part connected to the mentioned support of the wheel in response to an operating control that can be accessed by the user;
   wherein said operating means and said actuation means comprise a unique electric motor connected to rotate said first clutch part and said steering member and said operating control comprises first and second controls operated by the user to make said electric motor selectively rotate in a first direction and in an opposite second direction, the first clutch part engaging the second clutch part to make it rotate in a first direction when the motor is rotated in said first direction, and the first clutch part engaging the second clutch part to make it rotate in a second direction when the motor is rotated in said second direction,
   such that, when the first and second clutch parts are uncoupled, the wheel is a freely self-steering wheel, and when the first and second clutch parts are coupled, the orientation of the wheel is controlled by means of said first and second controls.

2. The device according to claim 1, wherein the first clutch part comprises a first pinion which is connected to an output shaft of said electric motor and permanently meshed with a second pinion mounted on a bracket which can freely pivot about said output shaft of the electric motor, and said second clutch part comprises a gear wheel located to not mesh with the first pinion and selectively mesh with the second pinion when the first clutch part is rotated in said first and second directions.

3. The device according to claim 1, wherein the second clutch part is connected to the support of the wheel via a reducing mechanical transmission.

4. The device according to claim 1, further comprising an encoder connected to the support of the wheel to send a signal representative of the angular position of the support of the wheel to electronic control means in connection with the electric motor.

* * * * *